United States Patent
Matsuyama et al.

(10) Patent No.: US 6,895,354 B2
(45) Date of Patent: May 17, 2005

(54) SYSTEM AND METHOD FOR GENERATING THERMAL NETWORK DATA AND RECORDING MEDIUM

(75) Inventors: Hidehito Matsuyama, Tokyo (JP); Hirokazu Tohya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/467,013

(22) PCT Filed: Feb. 4, 2002

(86) PCT No.: PCT/JP02/00879

§ 371 (c)(1),
(2), (4) Date: Aug. 4, 2003

(87) PCT Pub. No.: WO02/063506

PCT Pub. Date: Aug. 15, 2002

(65) Prior Publication Data

US 2004/0073397 A1 Apr. 15, 2004

(30) Foreign Application Priority Data

Feb. 2, 2001 (JP) ........................... 2001-026493

(51) Int. Cl.[7] .............................................. G01K 17/00
(52) U.S. Cl. ..................................................... 702/136
(58) Field of Search ........................ 702/99, 130, 136, 702/132, 133; 374/100, 101

(56) References Cited

U.S. PATENT DOCUMENTS 6,618,694 B1 * 9/2003 Shibuya et al. ................ 703/1

FOREIGN PATENT DOCUMENTS

| JP | 1-318163 | 12/1989 |
| JP | 4-7675 | 1/1992 |
| JP | 07-311166 | * 11/1995 |
| JP | 2596847 | * 1/1997 |

* cited by examiner

Primary Examiner—Michael Nghiem
(74) Attorney, Agent, or Firm—Young & Thompson

(57) ABSTRACT

A method for generating thermal network data for use in thermal analysis of a coupling structure of a large number of components. Depending on the density of nodes having a position defined by the structure, two-dimensional quadtree area division or three-dimensional octtree area division is performed. A node is provided in the center of the divided area and anode is determined using approximation to a node having a position defined by the structure. Alternatively, an area and a node are determined using Voronoi area division in case of area subdivision where a small area is assigned only to a defined node. Thermal network data is generated by inserting thermal resistances between respective nodes.

13 Claims, 12 Drawing Sheets

FIG. 2
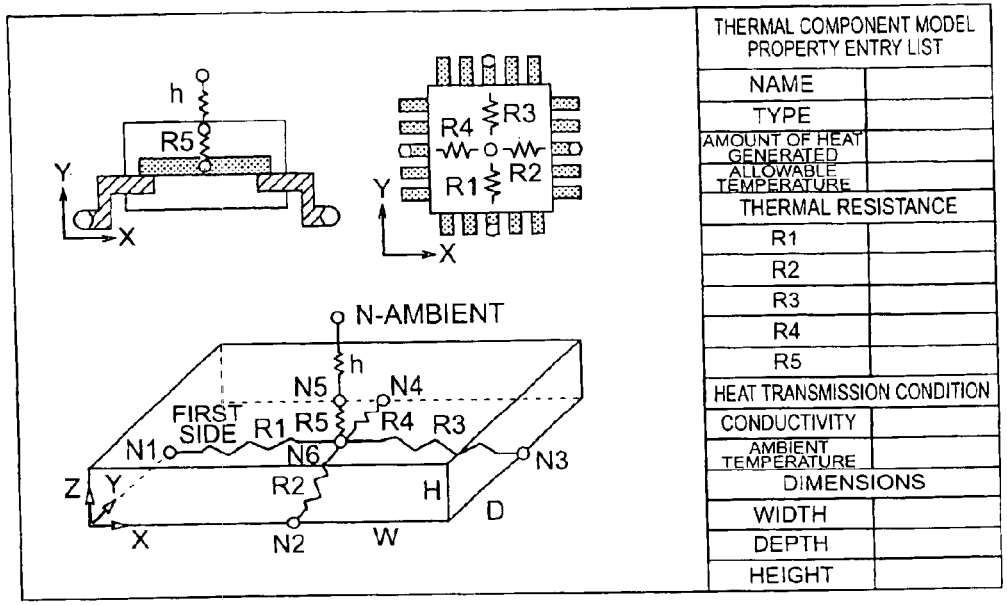
(a) EXAMPLE OF LSI DATA
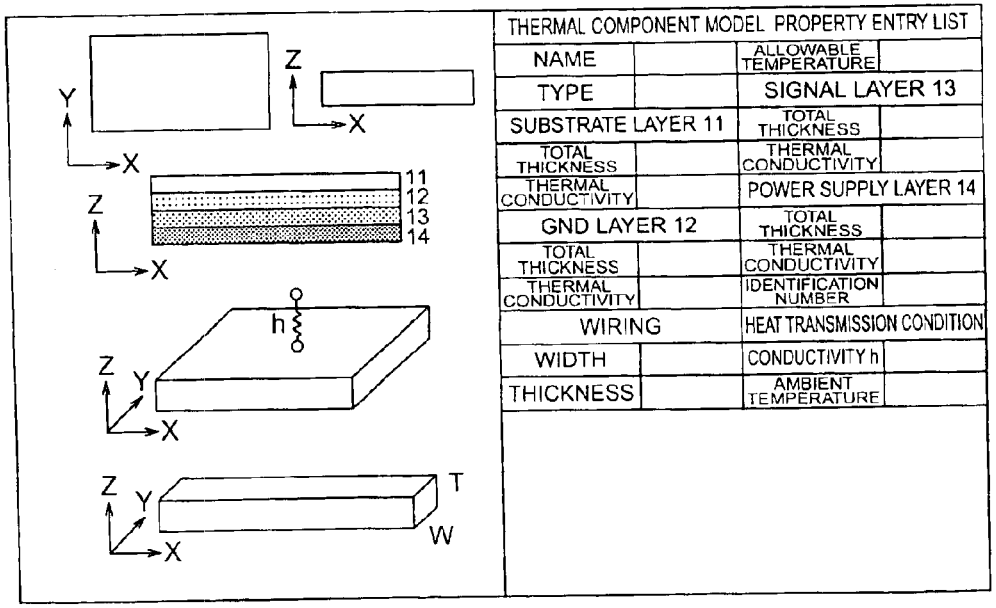
(b) EXAMPLE OF PCB DATA
EXAMPLE OF THERMAL COMPONENT DATA (a) WIRING LAYOUT (b) LSI LAYOUT

EXAMPLE OF COMPONENT LAYOUT DATA (a) INITIAL SMALL AREAS (b) NODE ELIMINATION (c) VORONOI AREA DIVISION (d)

FIG. 9
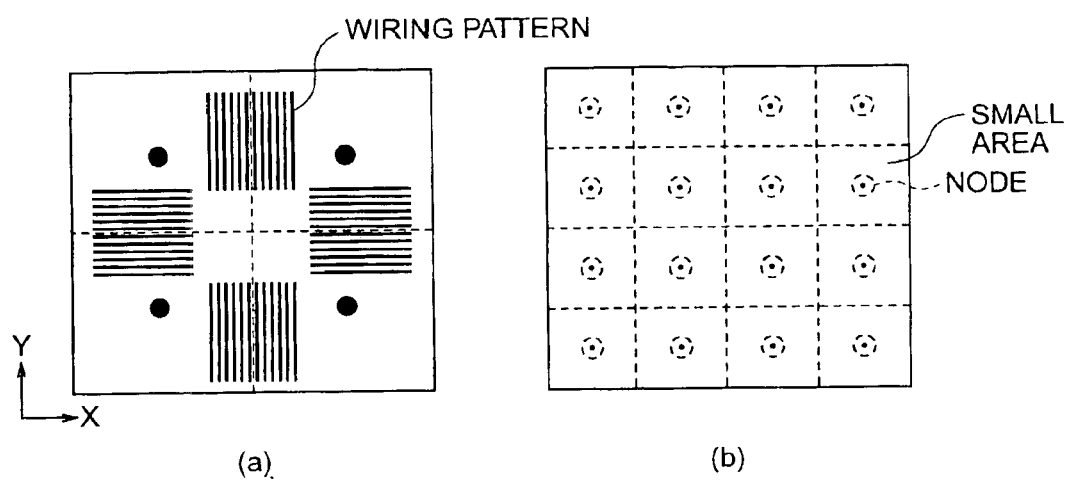
(a)    (b)
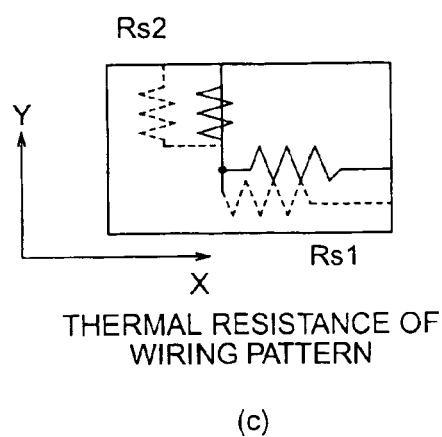
THERMAL RESISTANCE OF
WIRING PATTERN
(c)

FIG. 11
(PRIOR ART)
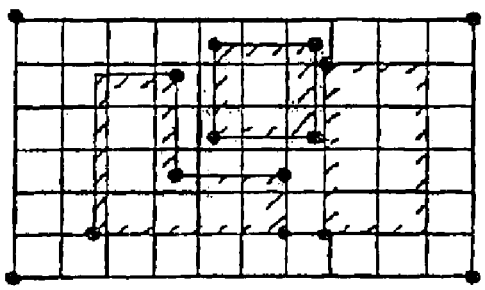
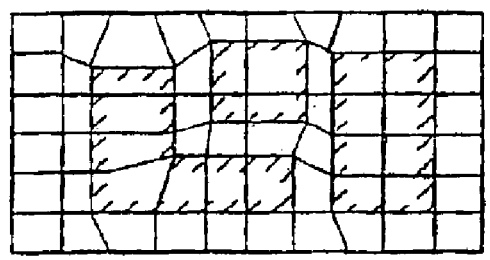
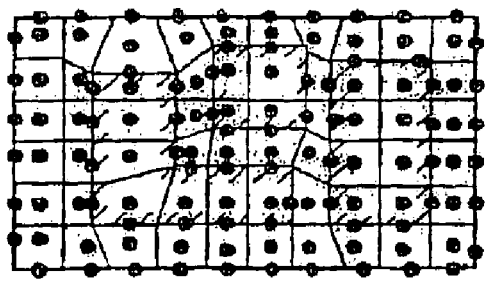

SYSTEM AND METHOD FOR GENERATING THERMAL NETWORK DATA AND RECORDING MEDIUM

TECHNICAL FIELD

The present invention relates to a technology for generating thermal network data, and more particularly to the technology for generating thermal network data for use in thermal analysis of a coupling structure of a plurality of components, such as a circuit board having a large number of components mounted thereon.

BACKGROUND ART

Recently, as the downsizing of electronic apparatuses and the integration of integrated circuits progress, thermal analysis during the design time becomes a factor indispensable to designing electronic apparatuses. Among the computing methods for thermal analysis is a thermal network method which is widely known. As shown in FIG. 10, the thermal network method divides an analysis target into small areas according to its shape, boundary condition, and the like, and provides nodes for representing the temperatures of the small areas. This makes it possible to obtain solutions of high precision with computational complexity of relatively small scale. In FIG. 10, focusing on a node Ni, the amount of heat occurring from the node Ni is given by:

(the amount of heat flowing out of the node Ni to a node N1)+(the amount of heat flowing out of the node Ni to a node N2)+ . . . +(the amount of heat flowing out of the node Ni to a node Nj).

The thermal network method involves the operation of expressing a target to be analyzed in the form of a thermal equivalent circuit as described above. Initially, the internal of an electronic apparatus is divided into several small areas. Representative points called nodes are provided in these areas. A node is a point for representing the temperature of a certain area, and typically falls on the center of the area. Next, the nodes are coupled to each other with thermal resistances so that the entire electronic apparatus is expressed in the form of a thermal equivalent network. From the thermal network data thus generated, simultaneous linear equations are created which show the energy balance between the individual areas. These equations can be solved to determine the temperatures and heat flow rates of the nodes.

In the area division of the conventional method for generating thermal network data, uniform area division according to the shape of the analysis target is typically performed before nodes are established to generate thermal network data. As employed herein, "uniform area division" refers to dividing the area of a plurality of components coupled into small areas having a size necessary to show the coupling state. For example, Japanese Patent Publication No. 2596847 discloses a method of dividing an analysis target into rectangular small areas and adjusting mismatches between the small areas (see FIG. 11). Moreover, Japanese Patent Laid-Open Publication No. Hei 7-311166 describes a method for area division and thermal resistance generation in which an analysis target is initially divided into rectangular small areas, and thermal resistances are created from nodes to vertices of the rectangular areas as necessary (see FIG. 12).

In recent years, scenes to generate thermal network data on a coupling structure of a large number of components, as typified by a printed circuit board having a large number of components such as a large-scale integrated circuit (LSI) mounted thereon, are on the increase. In such cases, the conventional method for generating thermal network data has the following problems.

A first problem occurs at the time of application of the conventional method for area division. In the conventional method for area division, the uniform area division to a size necessary to show the coupling state is performed on the entire area of a plurality of components coupled, thereby generating small areas. Consequently, when a plurality of components of large and small, various sizes are coupled in an area, the size of the small areas necessary to show the coupling state becomes small. As a result, the number of small areas and the number of nodes increase to make the thermal network data larger in scale. Since the thermal network data, the input data of thermal analysis, is of larger scale, it becomes difficult to apply the thermal analysis during the design time. In other words, it becomes difficult to secure practical calculation speed while ensuring the calculating precision.

For a second problem, the same problem as described above also occurs when the generation of thermal network data takes account of a wiring pattern in addition to the coupling structure of a large number of components. That is, the increase in the scale of the thermal network data makes it difficult to apply the thermal analysis during the design time.

DISCLOSURE OF THE INVENTION

A first object of the present invention is to provide a system, method, and recording medium for generating thermal network data having computational complexity of practical scale on a coupling structure of a large number of components, typified by a printed circuit board having a large number of components such as an LSI mounted thereon, thereby allowing thermal analysis.

A second object of the present invention is to provide a system, method, and recording medium for generating thermal network data having computational complexity of practical scale, thereby allowing thermal analysis even when the generation of the thermal network data also takes a wiring pattern into account. Here, the "practical scale" refers to such a scale of data that solutions can be obtained with a memory as small as possible, at a high speed without a decrease in precision.

The following describes the means for achieving the first object of the present invention. To give the rough meanings of terms used in the following description, quadtree area division refers to square area division based on a certain rule. Octtree area division refers to cubic area division based on a certain rule. Voronoi area division refers to area division by means of assignment of areas to an arbitrary number of points given in a plane or space. When a combination of a large number of components is regarded as a plane (two-dimensional) structure, a large number of node positions and areas are defined by constraint of the coupling structure of the components. Here, the plane structure is subjected to quadtree area division according to the density of such position-defined nodes, thereby generating two-dimensional small areas and nodes. Then, nodes generated by the quadtree area division, lying near the position-defined nodes are considered as lying approximately in the same positions. The position-defined nodes are transferred to the nodes that are considered as lying in the same positions. Alternatively, the nodes that are considered as lying in the same positions may be transferred to the position-defined nodes. As above, in the area division on a two-dimensional structure, the algorithm of quadtree area division can be introduced to generate thermal network data of small scale.

Even when a combination of a large number of components is regarded as a solid (three-dimensional) structure, a large number of node positions and areas are also defined by constraint of the coupling structure of the components as is the case with a plane (two-dimensional) structure. Here, the solid structure is subjected to octtree area division according to the density of such position-defined nodes, thereby generating three-dimensional small areas and nodes. Then, nodes generated by the octtree area division, lying near the position-defined nodes are considered as lying approximately in the same positions. The position-defined nodes are transferred to the nodes that are considered as lying in the same positions. Alternatively, the nodes that are considered as lying in the same positions may be transferred to the position-defined nodes. As above, in the area division on a solid structure, the algorithm of octtree area division can be introduced to generate thermal network data of small scale as is the case with a plane structure.

In the area division by the foregoing means, the dividing process (subdivision) is iterated until the divided areas contain only a single node having a position defined by the constraint of the components to be coupled. In the process of such subdivision, small areas irrelevant to any defined node (containing no defined node) may also occur at the same time. Then, in this process of subdivision, two-dimensional or three-dimensional Voronoi area division is applied to perform area division if it is desired that small areas containing defined nodes be generated exclusively (any small area containing no defined node not be generated) to reduce the total number of nodes. Even when Voronoi area division is applied thus, the method using quadtree area division or octtree area division is used as the basis of the area division. It becomes therefore possible to generate thermal network data of small scale as in the case with approximation.

The following describes the means for achieving the second object of the present invention. Initially, a combination of a large number of components is subjected to quadtree area division (octtree area division if the target is regarded as three-dimensional). The divided areas are subdivided further by quadtree area division under a condition set arbitrarily according to the density of a wiring pattern. Here, based on the amounts of the wiring pattern passing through the subdivided small areas, equivalent thermal resistances of the wiring in the areas are determined. Then, the parallel sums with thermal resistances occurring between the individual areas are worked out. This makes it possible to generate thermal network data of small scale with the wiring pattern taken into account. Even when the wiring pattern is thus taken into account, the method using quadtree area division or the like is used as the basis of the area division. Besides, quadtree area division or the like is further performed depending on the density of the wiring pattern. It becomes therefore possible to generate thermal network data of small scale.

According to the method and system for generating thermal network data of the present invention, thermal analysis on a coupling structure of a large number of components, such as a printed circuit board having a large number of electronic components mounted thereon, can be performed with computational complexity of practical scale through the introduction of the algorithm of quadtree area division or octtree area division. As a result, practical calculation speed is secured. The same effect can also be obtained when such an algorithm and Voronoi area division are used in combination. Furthermore, the influence of the wiring pattern can be reflected on the thermal network data without an increase in analysis scale, thereby allowing more practical thermal analysis.

BRIEF DESCRIPTION OF THE DRAWINGS

FIGS. 2(a) and 2(b) are diagrams showing examples of thermal characteristics component data, FIG. 2(a) showing an example of LSI data and FIG. 2(b) an example of PCB data;

FIGS. 9(a) to 9(c) are diagrams showing the processing of the fourth embodiment, FIG. 9(a) showing a wiring pattern, FIG. 9(b) small areas taken account of the wiring pattern, and FIG. 9(c) thermal resistances of the wiring pattern;

FIG. 11 is a plan view showing step by step the thermal analysis process described in a conventional art.

BEST MODE FOR CARRYING OUT THE INVENTION

Hereinafter, embodiments of the present invention are described with reference to the drawings. The following embodiments deals with the cases where a large-scale integrated circuit (LSI) is arranged on a printed circuit board (PCB). Nevertheless, the method of the present invention is not limited to the combination of a PCB and an LSI, but is widely applicable to the thermal analysis of targets having a coupling structure of a large number of components.

Figure 1:
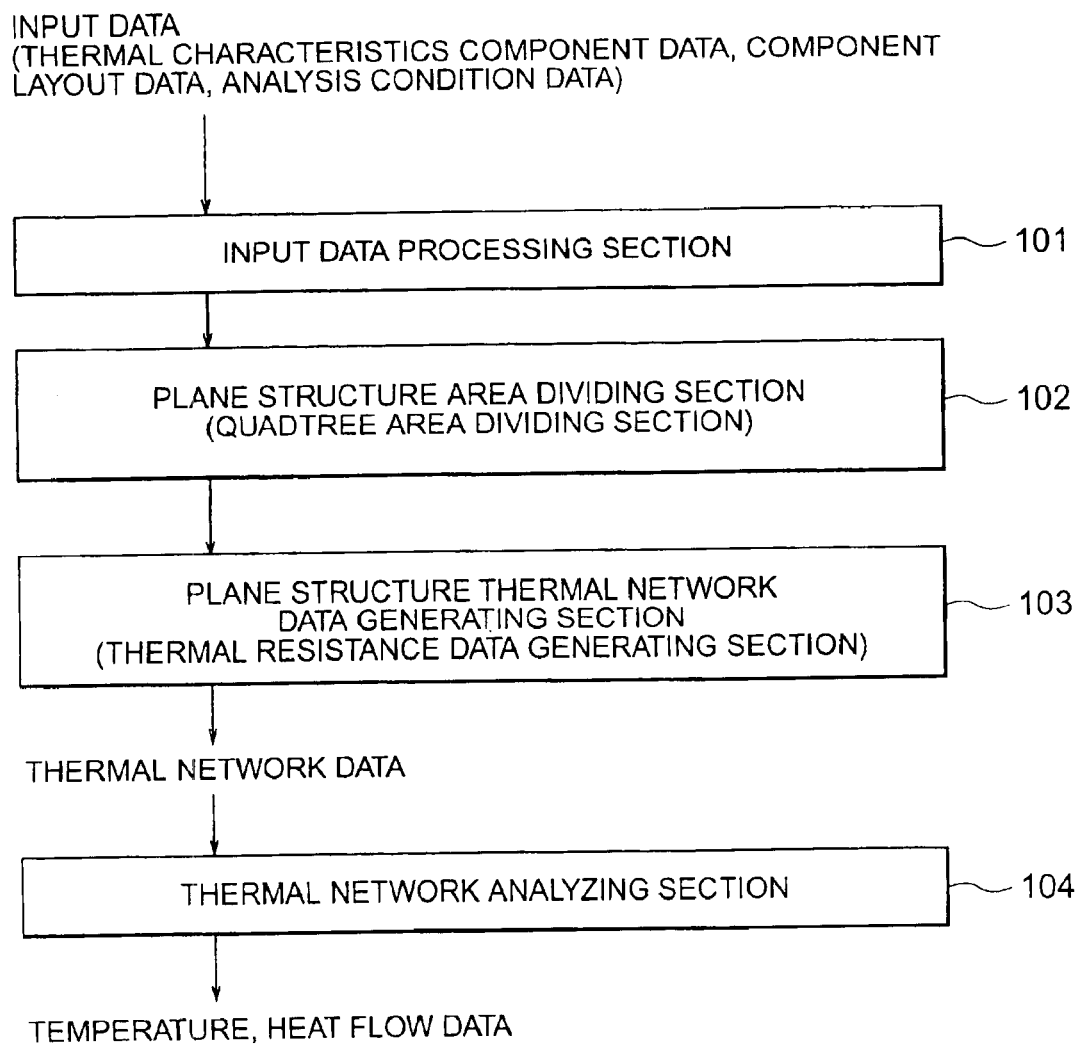
FIG. 1 is a block diagram showing the configuration of a program for use in the method of a first embodiment of the present invention.

For a first embodiment, description is initially given of the case of applying quadtree area division, regarding the analysis target of the thermal analysis as a plane structure (two-dimensional structure). FIG. 1 is a block diagram showing the configuration of a program for generating thermal network data for use in the method of the present embodiment. As shown in the diagram, the program includes: an input data processing section 101 for inputting input data including thermal characteristics component data, component layout data, and analysis condition data; a plane structure area dividing section 102 for performing quadtree area division; a plane structure thermal network data generating section 103 for outputting thermal network data including thermal resistance data; and a thermal network analyzing section 104 for outputting desired temperature and heat flow data.

The input data is composed of the thermal characteristics component data and boundary condition data of components to be arranged in an area, and the analysis condition data. These data must be prepared in advance for the sake of generating thermal network data. FIGS. 2(*a*) and 2(*b*) show examples of the thermal characteristics component data of the LSI and PCB which are the components in the LSI-PCB coupling structure. As shown in the diagrams, the thermal characteristics component data consists of a component type, dimension data showing the shape of the component, thermal resistance model data according to the component type, material properties, and boundary condition data.

The component layout data consists of position data which indicates the two-dimensional layout of the individual components. The analysis condition data is flag data for indicating whether to treat the target of the thermal analysis as a plane structure (two-dimensional structure) or a solid structure (three-dimensional structure), whether to add Voronoi area division to the area division, whether to take account of the wiring pattern in generating the thermal network data, and so on. Incidentally, in the present embodiment, the component coupling structure is treated as a plane structure. Voronoi area division is not added, and the wiring pattern is not taken into account.

The input processing section 101 reads and stores the input data. In the present embodiment, the input processing section 101 reads and stores the processing mode of "treating as a plane structure, adding no Voronoi area division, and not taking account of the wiring pattern," and then passes the input data to the plane structure area dividing section 102. Incidentally, the cases where Voronoi area division is added and/or the wiring pattern is taken into account are detailed later.

Figure 3:
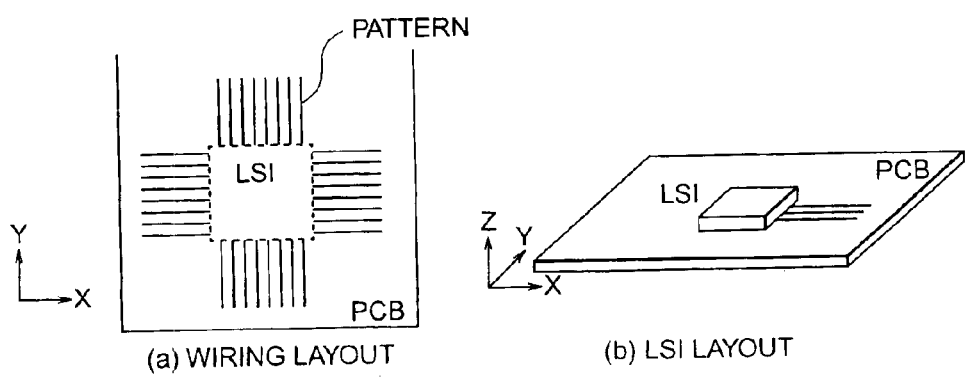
FIGS. 3(a) and 3(b) are diagrams showing examples of component layout data, FIG. 3(a) showing wiring layout and FIG. 3(b) LSI layout.

The plane structure area dividing section 102 determines which component to perform area division on according to the component type. In the coupling structure of the LSI and PCB in the present embodiment (FIGS. 3(*a*) and 3(*b*)), the thermal resistance data is previously known of the LSI itself (FIG. 2(*a*)). Thus, area division shall not be performed on the LSI but on the PCB alone. In the present embodiment, the plane structure area dividing section 102 consists of a quadtree area dividing section alone. Then, the plane structure is subjected to the quadtree area dividing section, so that the area is initially divided into an arbitrary number of square areas through quadtree area division. Nodes are provided at the centers of the areas (FIG. 4(*a*)).

When a combination of a PCB and a large number of LSIs is regarded as a two-dimensional (plane) structure, a large number of node positions and areas are defined by the constraint of the coupling structure. Here, an example of the constraint is that a single component having an unknown temperature distribution or a single structural portion (shaped portion) of a certain component has at least one area and a node having a position defined at the center. The term "node" is hereinafter used in two types of meanings. Nodes having a defined position as above are referred to as "defined nodes." The other nodes, provided in areas resulting from quadtree area division and the like, are referred to simply as "nodes" (FIG. 4(*a*)). Here, when a small area of the PCB resulting from quadtree area division contains a plurality of defined nodes, subdivision is performed by using quadtree area division and nodes are provided (FIG. 4(*b*)). At the same time, the node lying in the area before the subdivision is eliminated. The subdivision is iterated until a single small area contains a single defined node. The subdivision is ended when the number of defined nodes lying in a single small area becomes one. Nodes that are determined to lie near the defined nodes based on an index set arbitrarily are regarded as lying in the same positions, and transferred to the defined nodes (FIG. 4(*c*)). Alternatively, the defined nodes are transferred to the nodes (FIG. 4(*d*)). Such transfer of defined nodes means that the layout data is modified by approximation for thermal analysis.

Figure 4:
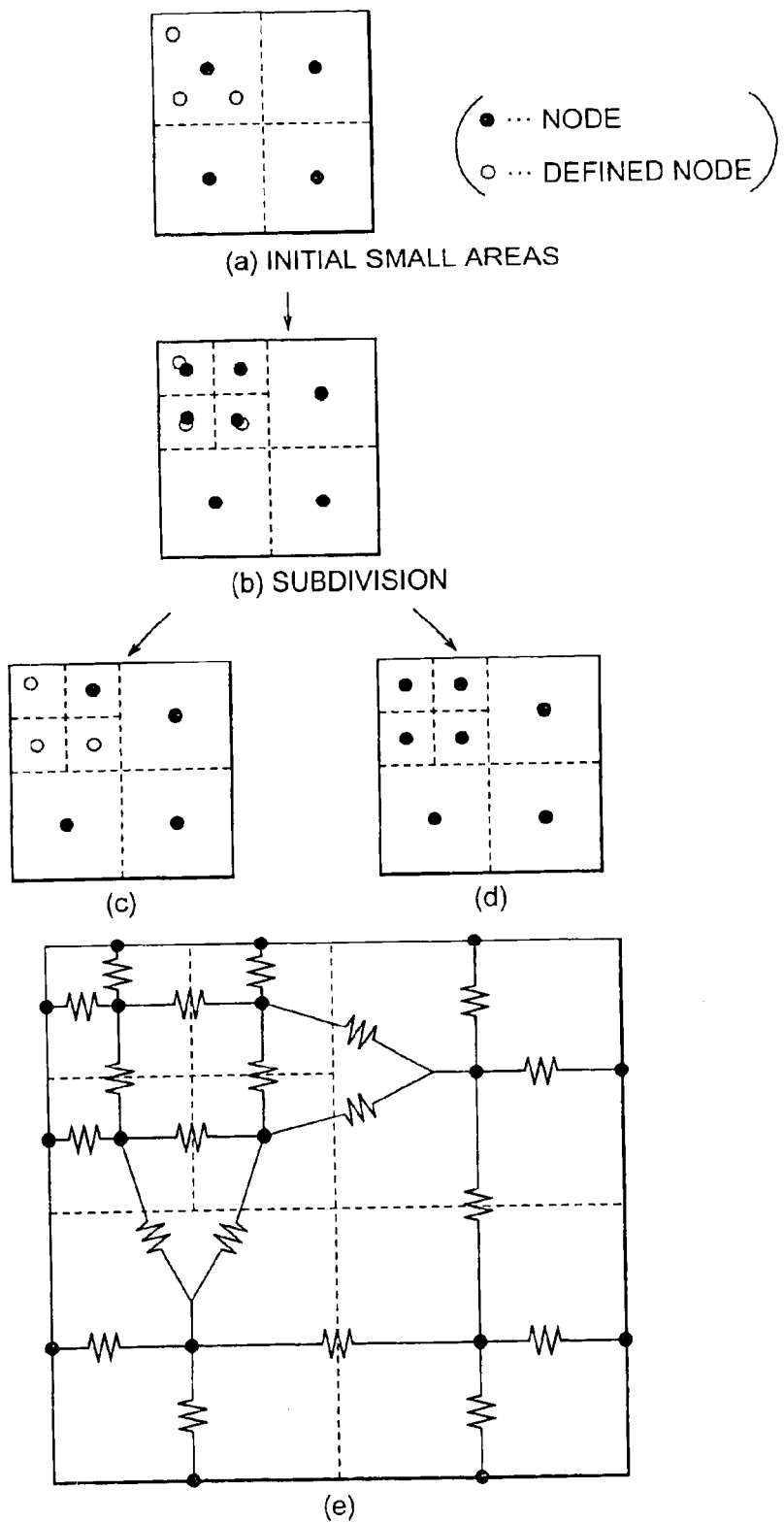
FIG. 4(a) to 4(e) are flow diagrams showing the method of the first embodiment, FIG. 4(a) showing initial small areas, FIG. 4(b) subdivided areas, FIG. 4(c) a method of node approximation, FIG. 4(d) another method of node approximation, and FIG. 4(e) a thermal network.

The small areas and node position data generated are passed to the plane structure thermal network data generating section 103. The plane structure thermal network data generating section 103 of the present embodiment consists of a thermal resistance data generating section alone. The thermal resistance data generating section generates thermal resistance data on the substrate, the ground layer, and the like from their dimensions, sectional areas, and material properties. FIG. 4(*e*) shows an example of thermal resistance data that is generated from the small areas and nodes generated by quadtree area division.

The thermal network data generated thus is input to the thermal network analyzing section 104. Based on the thermal network data, the thermal network analyzing section 104 creates simultaneous linear equations showing the energy balance among the individual areas, and solves these for thermal analysis. As a result, the temperature and thermal flow data of the nodes is obtained. Since the nodes are the representative points of the areas containing the nodes, the temperature and heat flow data of the nodes shows the temperature and heat flow data of the entire areas containing the nodes.

In the present embodiment, the introduction of the quadtree area division technique into the area division reduces the thermal network data and allows thermal analysis of practical scale. Repeating quadtree area division until a single small area contains a single defined node means that when there is no defined nodes to lie in a single small area, the area division need no longer be iterated on that small area. Finally, the area division is completed with as many nodes as the number of the small areas. The amount of thermal network data is in proportion to the number of nodes. The ultimate number of areas can be reduced by enabling area division corresponding to the distribution of defined nodes over the entire area of the target of the thermal analysis, or equivalently, by introducing the algorithm for such area division. The reduction in the ultimate number of areas allows a reduction in the ultimate number of nodes, and by extension a reduction of the thermal network data. Consequently, it is possible to shrink the amount of the thermal network data, i.e., the computational complexity of the thermal analysis without impairing the precision of the thermal analysis computation.

Figure 5:
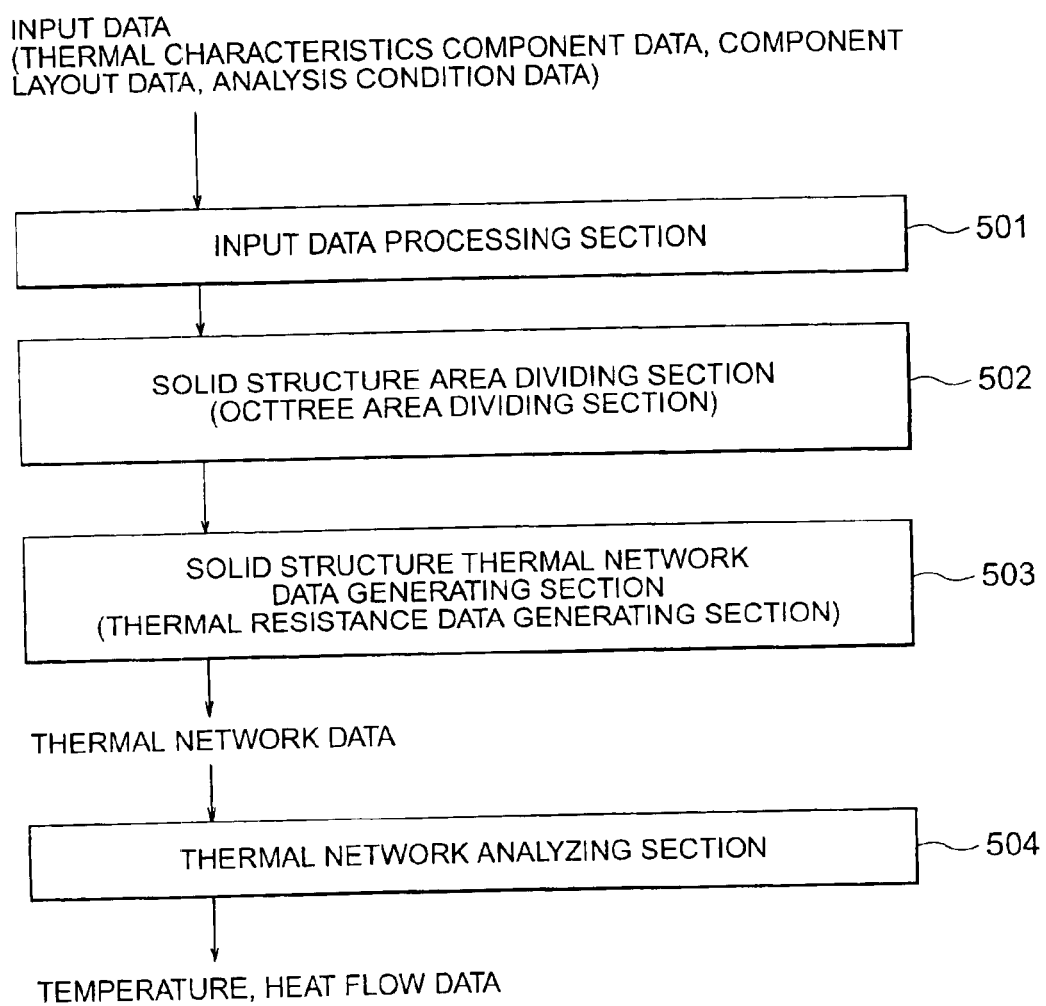
FIG. 5 is a block diagram showing the configuration of a program for use in the method of a second embodiment of the present invention.

Next, for a method of a second embodiment of the present invention, description is given of the case where octtree area division is applied regarding the analysis target of the thermal analysis as a solid structure (three-dimensional structure). FIG. 5 is a block diagram showing the configuration of a program for generating thermal network data according to the present embodiment. As shown in the diagram, it includes: an input data processing section 501 for inputting thermal characteristics component data, component layout data, and analysis condition data; a solid structure area dividing section 502 (octtree area dividing section) a solid structure thermal network data generating section 503 for generating thermal resistance data and outputting thermal network data; and a thermal network analyzing section 504 for outputting temperature and heat flow data.

The input data has the same configuration as in the first embodiment. The component layout data, however, consists of position data that indicates the three-dimensional layout of the individual components. Moreover, the analysis condition data is flag data for indicating whether to treat the target of the thermal analysis as a plane structure (two-dimensional structure) or a solid structure (three-dimensional structure), whether to add Voronoi area division to the area division, whether to take account of the wiring pattern in generating a thermal network, and so on. The present embodiment deals with the case of treating as a solid structure. Voronoi area division is not added, and the wiring pattern is not taken into account.

The input processing section 501 reads and stores the input data. In the present embodiment, the input processing section 502 reads and stores the processing mode of "treating as a solid structure, adding no Voronoi area division, and not taking account of the wiring pattern," and then passes the input data to the solid structure area dividing section 502.

The solid structure area dividing section 502 determines which component to perform area division on according to the component type. In the coupling structure of the LSI and PCB in the present embodiment, the thermal resistance data is previously known of the LSI itself (FIG. 2(a)). Thus, area division shall not be performed on the LSI but on the PCB alone. In the present embodiment, the solid structure area dividing section 502 consists of an octtree area dividing section alone. Here, the solid structure is subjected to the octtree area dividing section, so that the area is initially divided into an arbitrary number of cubes by octtree area division. Nodes are provided at the centers of the areas.

When a combination of a PCB and a large number of LSIs is regarded as a solid structure (three-dimensional structure), a large number of node positions and areas are defined by the constraint of the coupling structure. Again, as in the first embodiment, the two types of nodes are referred to separately as "defined nodes" and "nodes." When a small area of the PCB resulting from the octtree area division contains a plurality of defined nodes, subdivision is performed using octtree area division and nodes are provided. The repetition of subdivision and the approximation-based transfer of nodes are the same as in the first embodiment.

The three-dimensional small areas and node position data generated are passed to the solid structure thermal network data generating section 503. The solid structure thermal network data generating section 503 of the present embodiment consists of a thermal resistance data generating section alone. The thermal resistance data generating section generates thermal resistance data on the substrate, the ground layer, and the like from their dimensions, sectional areas, and material properties. The thermal network data generated thus is input to the thermal network analyzing section 504. The thermal analysis and the generation of the temperature and heat flow data of the nodes are the same as in the first embodiment.

In the present embodiment, the introduction of the octtree area division technique into the area division as described above reduces the thermal network data and allows thermal analysis of practical scale. That is, since the octtree area division is a three-dimensional application of the quadtree area division, the present embodiment provides the same effects as in the first embodiment, allowing a reduction in the amount of the thermal network data, i.e., the computational complexity of the thermal analysis without impairing the precision of the thermal analysis computation.

Now, description is given of a third embodiment of the present invention. In the first and second embodiments, the quadtree area division or octtree area division and the approximation of node positions are used to determine node positions which are the basis of the thermal network data. As described above, in the area division by such means, subdivision is iterated until divided areas contain only a single node having a position defined by the constraint of the components to be coupled. In the process of such subdivision, small areas containing no defined node may also occur at the same time. In the present embodiment, two-dimensional or three-dimensional Voronoi area division is applied in this process of subdivision if it is desired that small areas containing no defined node not be generated, and the total number of nodes be reduced.

Figure 6:
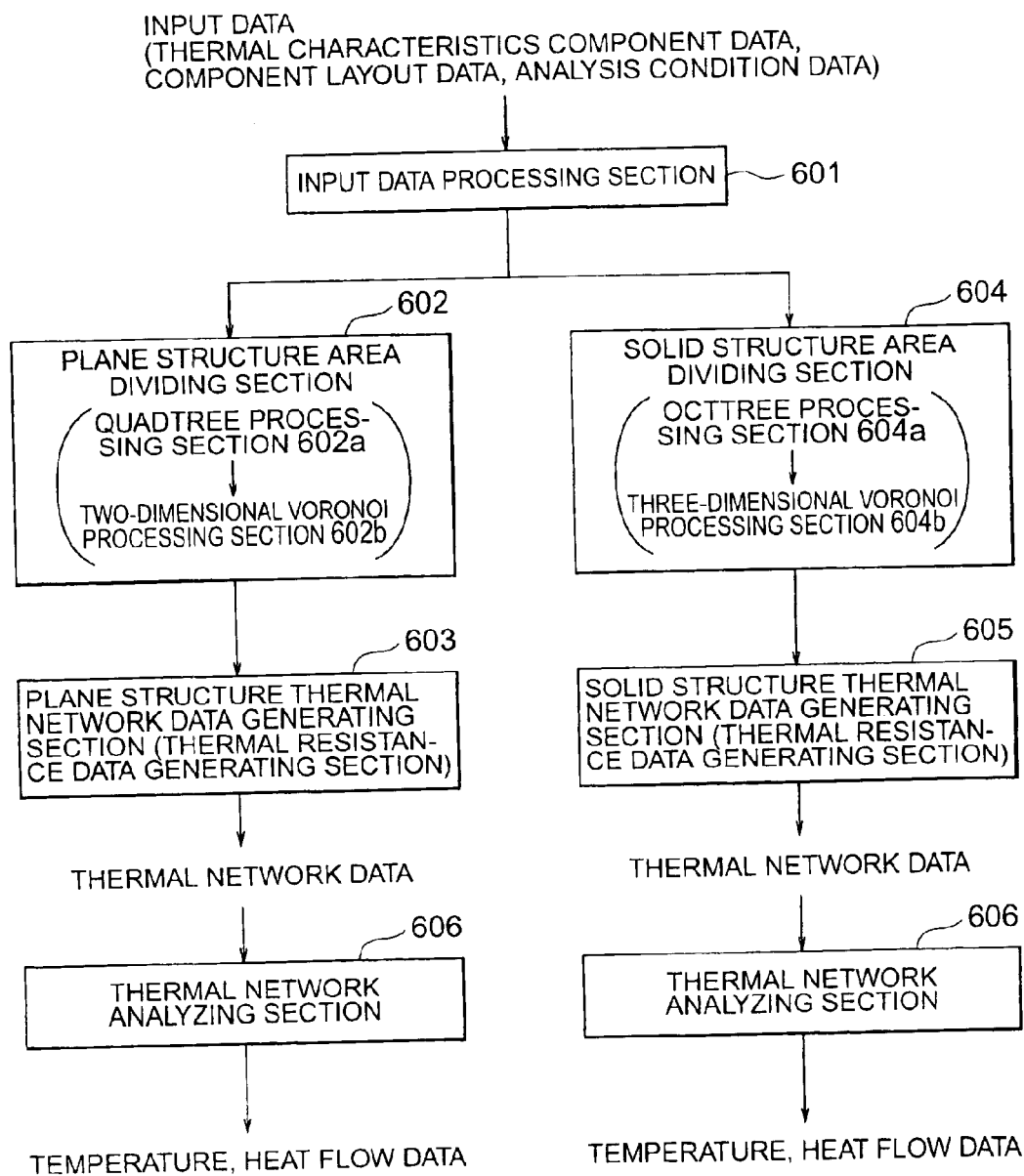
FIG. 6 is a block diagram showing the configuration of a program for use in the method of a third embodiment of the present invention.

The description is given of the case where quadtree area division is applied regarding the analysis target of the thermal analysis as a plane structure (two-dimensional structure), or octtree area division is applied regarding it as a solid structure (three-dimensional structure). FIG. 6 is a block diagram showing the configuration of a program for generating thermal network data for use in the method of the present embodiment. As shown in the diagram, the program includes: an input data processing section 601 for inputting input data including thermal characteristics component data, component layout data, and analysis condition data; a plane structure area dividing section 602 including a quadtree area dividing section 602a and a two-dimensional Voronoi processing section 602b; a solid structure area dividing section 604 including an octtree area dividing section 604a and a three-dimensional Voronoi processing section 604b; a plane structure thermal network data generating section 603 for generating thermal resistance data; a solid structure thermal network data generating section 605 for generating thermal resistance data and outputting thermal network data; and a thermal network analyzing section 606 for outputting temperature and heat flow data.

The input data has the same configuration as in the foregoing embodiments. The analysis condition data is flag data for indicating whether to treat the target of the thermal analysis as a plane structure (two-dimensional structure) or a solid structure (three-dimensional structure), whether to add Voronoi area division to the area division, whether to take account of the wiring pattern in generating a thermal network, and so on. In the present embodiment, the target is treated as a plane structure or a solid structure. Voronoi area division is added, and the wiring pattern is not taken into account.

The input processing section 601 reads and stores the input data. In the present embodiment, the input processing section 601 reads and stores the processing mode of "treating as a plane structure or a solid structure, adding Voronoi area division, and not taking account of the wiring pattern," and then passes the input data to the plane structure area dividing section 602 or the solid structure area dividing section 604.

The plane structure area dividing section 602 or the solid structure area dividing section 604 determines which component to perform area division on according to the component type. The plane structure or the solid structure is subjected to the quadtree area dividing section 602a or the octtree area dividing section 604a, whereby the area is initially divided into an arbitrary number of square small areas by quadtree area division or an arbitrary number of cubic small areas by octtree area division. Nodes are provided at the centers of the areas (FIG. 7(a)).

When a combination of a PCB and a large number of LSIs is regarded as a plane structure or a solid structure, a large number of node positions and areas are defined by the constraint of the coupling structure. "Nodes" and "defined nodes" have the same meanings as in the foregoing embodiments. Here, if a PCB small area resulting from quadtree area division or octtree area division contains a plurality of defined nodes, the defined nodes are removed (FIG. 7(b)). The two-dimensional Voronoi processing section 602b or the three-dimensional Voronoi processing section 604b performs Voronoi area division for the plurality of defined nodes, thereby generating small areas of any polygonal shapes (FIG. 7(c)). Here, unlike in the first and second embodiments, approximation-based node transfer is not performed.

Figure 7:
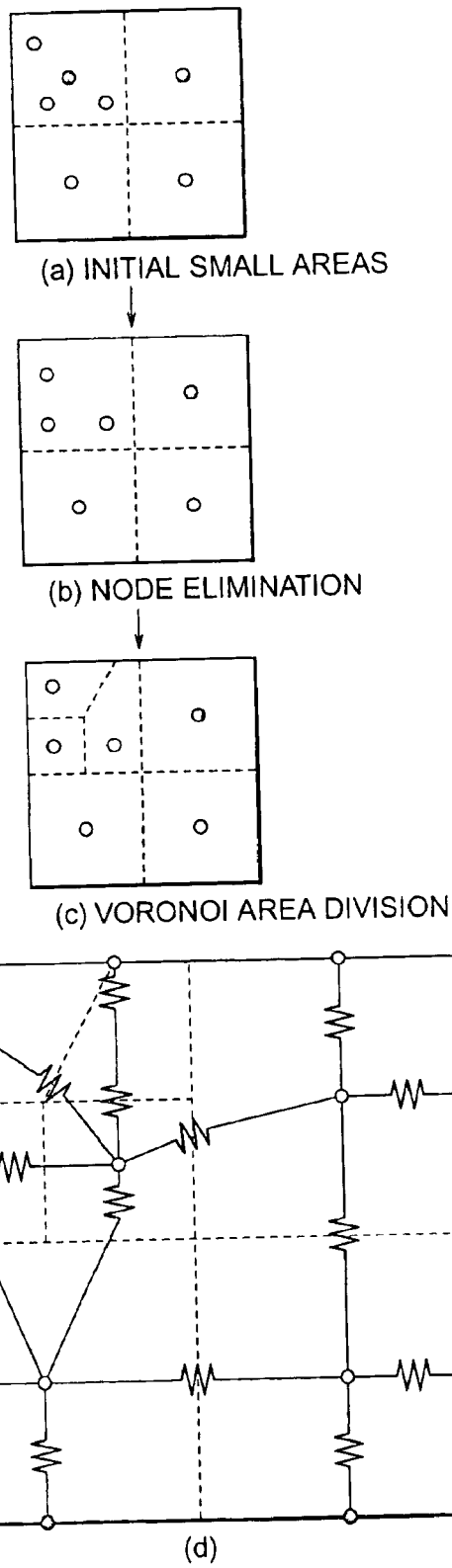
FIGS. 7(a) to 7(d) are flow diagrams showing the method of the third embodiment of the present invention, FIG. 7(a) showing initial small areas, FIG. 7(b) subdivided areas, FIG. 7(c) Voronoi area division, and FIG. 7(d) a thermal network.

The small areas and node position data generated are passed to the plane structure thermal network data generating section 603 having a thermal resistance data generating function or the solid structure thermal network data generating section 605 having a thermal resistance data generating function. Thermal resistance data on the substrate, the ground layer, and the like is generated therein from their dimensions, sectional areas, and material properties. FIG. 7(d) shows an example of thermal resistance data that is generated from the small areas and nodes generated by using quadtree area division and Voronoi area division in combination. The thermal network data generated thus is input to the thermal network analyzing section 606. The thermal analysis and the generation of the temperature and heat flow data of the nodes are the same as in the foregoing embodiments.

In the present embodiment, the technique of using the quadtree area division or octtree area division and the Voronoi area division in combination can be introduced into the area division as described above. This reduces the thermal network data and allows thermal analysis of practical scale. In this case, the effect of reducing the number of nodes through approximation as in the first and second embodiments is not provided. Nevertheless, since the quadtree area division or octtree area division according to the coupling structure of the components is used as the basis of the area division, it is possible to reduce the amount of the thermal network data than in conventional area division.

Now, for a fourth embodiment, description is given of the method for generating thermal network data with the thermal resistance of the wiring pattern also taken into account. In the present embodiment, quadtree area division is performed regarding the analysis target of the thermal analysis as a plane structure (two-dimensional structure), or octtree area division is performed regarding it as a solid structure (three-dimensional structure). Voronoi area division is also applied with one of these.

Figure 8:
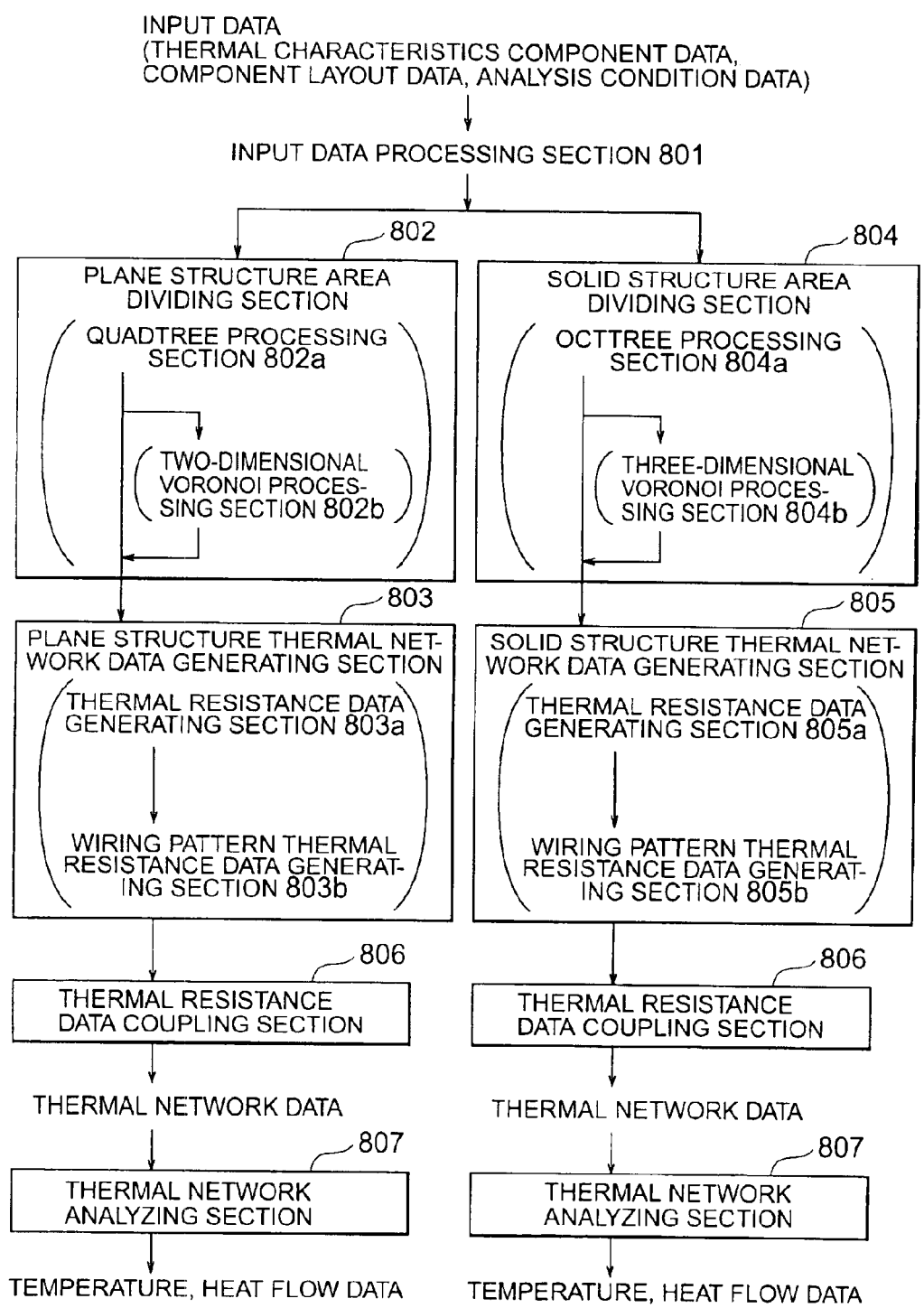
FIG. 8 is a block diagram showing the configuration of a program for use in the method of a fourth embodiment of the present invention.
Figure 10:
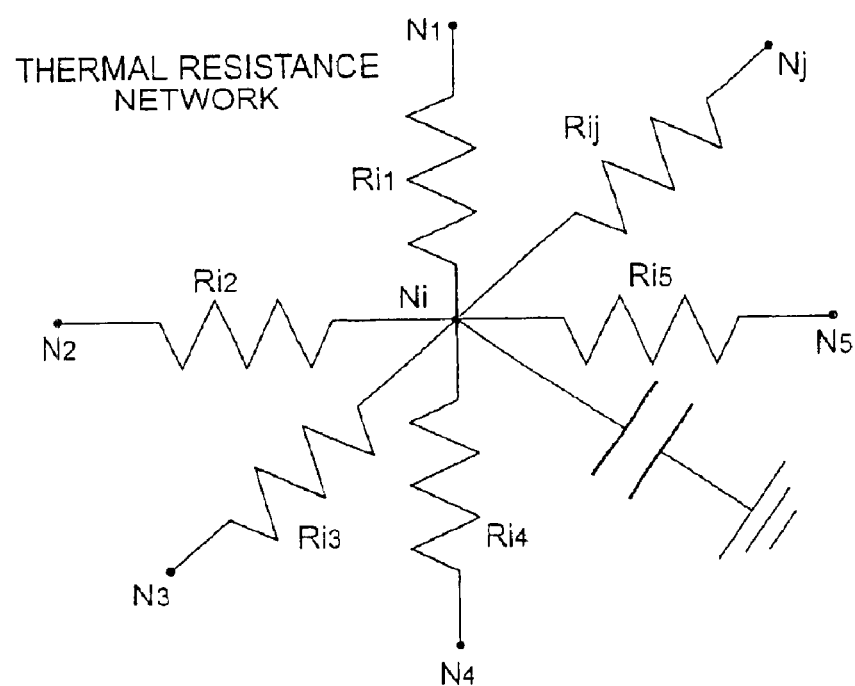
FIG. 10 is a circuit diagram showing an example of a thermal network used in conventional thermal analysis.
Figure 12:
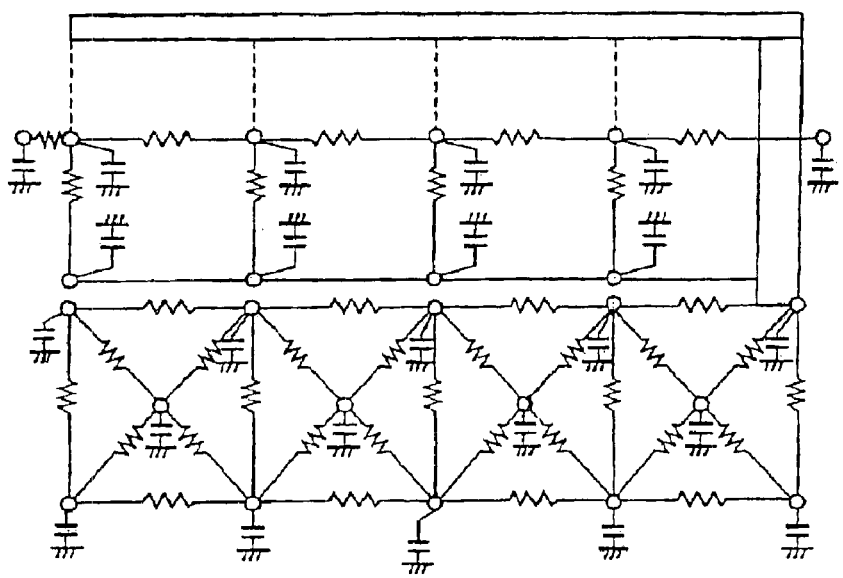
FIG. 12 is a circuit diagram of a thermal network described in another conventional art.

FIG. 8 shows the configuration of a program for generating thermal network data for use in the method of the present embodiment. As shown in the diagram, it includes: an input data processing section 801 for inputting thermal characteristics component data, component layout data, analysis condition data, and wiring pattern data; a plane structure area dividing section 802 having a quadtree area dividing section 802a and a two-dimensional Voronoi processing section 802b; a solid structure area dividing section 804 having an octtree area dividing section 804a and a three-dimensional Voronoi processing section 804b; a plane structure thermal network data generating section 803 having a thermal resistance data generating section 803a and a wiring pattern data generating section 803b; a solid structure thermal network data generating section 805 having a thermal resistance data generating section 805a and a wiring pattern data generating section 805b; a thermal resistance data coupling section 806 for outputting thermal network data; and a thermal network analyzing section 807 for outputting temperature and heat flow data.

The input data of the present embodiment is that of the embodiments described so far to which the wiring pattern data is added. The analysis condition data is flag data for indicating whether to treat the target of the thermal analysis as a plane structure (two-dimensional structure) or a solid structure (three-dimensional structure), whether to add Voronoi area division to the area division, whether to take account of the wiring pattern in generating a thermal network, and so on. The present embodiment deals with the case of treating as a plane structure or a solid structure. Voronoi area division may or may not be added, and the wiring pattern is taken into account.

The input processing section 801 reads and stores the input data. In the present embodiment, the input processing section 801 reads and stores the processing mode of "treating as a plane structure or as a solid structure, adding or not adding Voronoi area division, and taking account of the wiring pattern," and then passes the input data to the plane structure area dividing section 802 or the solid structure area dividing section 804.

The plane structure area dividing section 802 or the solid structure area dividing section 804 further subdivides divided small areas by quadtree area division or octtree area division under a uniform density condition which is set arbitrarily according to the density of the wiring pattern (FIG. 9(a)) as in the foregoing embodiments. The subdivided areas are provided with nodes while the nodes having been in the areas before the subdivision are eliminated (FIG. 9(b)). The repetition of the subdivision, the approximation, and the application of Voronoi area division are the same as in the embodiments described so far.

The small areas and node position data generated are passed to the plane structure thermal network data generating section 803. The thermal resistance data generating section 803a or 805a initially generates thermal resistance data on the substrate, the ground layer, and the like with consideration given to the thermal resistance model data, material properties, and boundary condition data out of the input data without taking account of the thermal resistance of the wiring pattern. Next, the wiring pattern thermal resistance data generating section 803b or 805b determines equivalent thermal resistances in the small areas based on the amounts of the wiring pattern passing through the subdivided small areas (FIG. 9(c)). Here, thermal resistances between nodes taking account of the wiring pattern are defined as the parallel sums of equivalent thermal resistances of the wiring pattern and the previously-generated thermal resistances between the small areas. According to this definition, the thermal resistance data coupling section 806 generate the thermal network data of the entire structure of the analysis target. The thermal network data generated thus is input to the thermal network analyzing section 807. The thermal analysis and the generation of the temperature and heat flow data of the nodes are the same as in the foregoing embodiments.

In the present embodiment, the application of quadtree area division and the octtree area division to the area division makes it possible to generate thermal network data of practical computation scale. Moreover, even when the wiring pattern is taken into account, subdivision is performed through the application of the quadtree area division according to the density of the wiring pattern. It is therefore possible to reduce the amount of the thermal network data.

Industrial Applicability

The method and system for generating a thermal network of the present invention are used to generate a thermal network for use in thermal analysis of various apparatuses having a coupling structure of a plurality of components, such as a printed circuit board having LSI and other components mounted thereon.

What is claimed is:

1. A thermal network data generating system for generating thermal network data for use in thermal analysis targeted at a coupling structure of a plurality of components, said system comprising:

an input data processing section for selecting either a process regarding an analysis target as a two-dimensional structure or a process regarding the analysis target as a three-dimensional structure based on an analysis condition, and determining a component on which an area division is to be performed based on a component type;

an area dividing section for performing one of dividing processes including quadtree area division regarding the analysis target as a two-dimensional structure and octtree area division regarding the analysis target as a three-dimensional structure, iterating said dividing process until each area divided by said dividing process contains only a single node having a position defined by constraint of components to be coupled, providing a node at a predetermined position of each area divided by said dividing process, and considering, among nodes having positions defined by the constraint of said components to be coupled, one of the nodes lying in a vicinity of nodes positioned at the predetermined positions of the areas divided by said dividing process as lying approximately in the same positions as those of the nodes positioned at the predetermined positions of the areas based on an index set arbitrarily; and a thermal network data generating section for generating thermal network data for connecting together determined nodes via thermal resistances having thermal resistance values according to the sizes and properties of said components to be coupled.

2. The thermal network data generating system according to claim 1, wherein:

said area dividing section, in addition to performing said dividing process, further subdivides the areas divided by said dividing process based on the density of a wiring pattern laid in the analysis target subjected to said dividing process, under a uniform density condition set arbitrarily; and said thermal network data generating section, in addition to performing the generation of the thermal network data for connecting together the determined nodes via the thermal resistances having the thermal resistance values according to the sizes and properties of said components to be coupled, determines equivalent thermal resistances in said small areas based on the amounts of said wiring pattern passing through said subdivided areas and defines thermal resistances as parallel sums of said equivalent thermal resistances in said small areas based on to the amounts of said wiring pattern and said previously-generated thermal resistances between the nodes.

3. The thermal network data generating system according to claim 2, wherein said coupling structure of the plurality of components is a coupling structure of a large-scale integrated circuit and a printed circuit board.

4. The thermal network data generating system according to claim 1, wherein said coupling structure of the plurality of components is a coupling structure of a large-scale integrated circuit and a printed circuit board.

5. A thermal network data generating system for generating thermal network data for use in thermal analysis targeted at a coupling structure of a plurality of components, said system comprising:

an input data processing section for selecting either a process regarding an analysis target as a two-dimensional structure or a process regarding the analysis target as a three-dimensional structure based on an analysis condition, and determining a component on which area division is to be performed based on a component type;

an area dividing section for performing one of dividing processes including quadtree area division regarding the analysis target as a two-dimensional structure and octtree area division regarding the analysis target as a three-dimensional structure, providing nodes at the center of each area divided by said dividing process, eliminating, if a single small area divided by said dividing process contains a plurality of nodes each having a position defined by constraint of components to be coupled, the node positioned at the center of the small area having the plurality of nodes each having the position defined by the constraint of said components to be coupled, and applying Voronoi area division to the single small area containing the plurality of nodes each having the position defined by the constraint of said components to be coupled, so as to generate further small areas having nodes each having the position defined by the constraint of said components to be coupled as representative points thereof; and a thermal network data generating section for generating thermal network data for connecting together determined nodes via thermal resistances having thermal resistance values according to the sizes and properties of said components to be coupled.

6. The thermal network data generating system according to claim 5, wherein:

said area dividing section, in addition to performing said dividing process, further subdivides the areas divided by said dividing process based on the density of a wiring pattern laid in the analysis target subjected to said dividing process, under a uniform density condition set arbitrarily; and said thermal network data generating section, in addition to performing the generation of the thermal network data for connecting together the determined nodes via the thermal resistances having the thermal resistance values according to the sizes and properties of said components to be coupled, determines equivalent thermal resistances in said small areas based on the amounts of said wiring pattern passing through said subdivided areas and defines thermal resistances as parallel sums of said equivalent thermal resistances in said small areas based on to the amounts of said wiring pattern and said previously-generated thermal resistances between the nodes.

7. The thermal network data generating system according to claim 5, wherein said coupling structure of the plurality of components is a coupling structure of a large-scale integrated circuit and a printed circuit board.

8. A thermal network data generating method for generating thermal network data for use in thermal analysis targeted at a coupling structure of a plurality of components, said method comprising the steps of:

selecting one from between quadtree area division regarding the analysis target as a two-dimensional structure and octtree area division regarding an analysis target as a three-dimensional structure based on an analysis condition;

determining a component on which area division is to be performed based on a component type;

performing a dividing process selected from between said quadtree area division and said octtree area division;

iterating said dividing process until areas divided by said dividing process contain only a single node having a position defined by constraint of components to be coupled;

providing a node at the centers of each area divided by said dividing process;

considering, among nodes having positions defined by the constraint of said components to be coupled, one of the nodes lying in a vicinity of a node positioned at the center of the area divided by said dividing process as lying approximately in the same position as that of the node positioned at the center of the area based on an index set arbitrarily; and generating thermal network data connecting together determined nodes via thermal resistances having thermal resistance values according to the sizes and properties of said components to be coupled.

9. The thermal network data generating method according to claim 8, further comprising the steps of:

subdividing the areas divided by said dividing process based on the density of a wiring pattern laid in the analysis target divided by said dividing process, under a uniform density condition set arbitrarily; and determining equivalent thermal resistances in said small areas based on the amounts of said wiring pattern passing through said subdivided areas, and defining thermal resistances as parallel sums of the equivalent thermal resistances in said small areas based on the amounts of said wiring pattern and the previously-generated thermal resistances between the nodes.

10. A recording medium containing a program for allowing a computer to execute the thermal network data generating method according to claim 8.

11. A thermal network data generating method for generating thermal network data for use in thermal analysis targeted at a coupling structure of a plurality of components, said method comprising the steps of:

selecting one from between quadtree area division regarding the analysis target as a two-dimensional structure and octtree area division regarding an analysis target as a three-dimensional structure according to an analysis condition;

determining a component on which area division is to be performed based on a component type;

performing a dividing process selected from between said quadtree area division and said octtree area division;

positioning a node at the center of each area divided by said dividing process;

eliminating, if a single small area divided by said dividing process contains a plurality of nodes each having a position defined by constraint of components to be coupled, the node provided at the center of the single small area containing the plurality of nodes having the position defined by the constraint of said components to be coupled, and applying Voronoi area division to the single small area containing the plurality of nodes having the position defined by the constraint of said components to be coupled, so as to generate further small areas having the nodes having the positions defied by the constraint of said components to be coupled as representative points thereof; and generating thermal network data for connecting together determined nodes via thermal resistances having thermal resistance values according to the sizes and properties of said components to be coupled.

12. The thermal network data generating method according to claim 11, further comprising the steps of:

subdividing the areas divided by said dividing process based on the density of a wiring pattern laid in the analysis target divided by said dividing process, under a uniform density condition set arbitrarily; and determining equivalent thermal resistances in said small areas based on the amounts of said wiring pattern passing through said subdivided areas, and defining thermal resistances as parallel sums of the equivalent thermal resistances in said small areas based on the amounts of said wiring pattern and the previously-generated thermal resistances between the nodes.

13. A recording medium containing a program for allowing a computer to execute the thermal network data generating method according to claim 11.

* * * * *